(12) United States Patent
Kissel

(10) Patent No.: US 10,237,162 B2
(45) Date of Patent: Mar. 19, 2019

(54) DEVICE FOR BUNDLING A PLURALITY OF INTERNET ACCESS MEDIA WITH FORWARD ERROR CORRECTION

(71) Applicant: Viprinet Europe GmbH, Bingen am Rehin (DE)

(72) Inventor: Simon Kissel, Bingen am Rhein (DE)

(73) Assignee: Viprinet Europe GmbH, Bingen am Rhein (DE)

( * ) Notice: Subject to any disclaimer, the term of this patent is extended or adjusted under 35 U.S.C. 154(b) by 0 days.

(21) Appl. No.: 15/317,202

(22) PCT Filed: Jun. 10, 2015

(86) PCT No.: PCT/EP2015/001167
§ 371 (c)(1),
(2) Date: Jan. 31, 2017

(87) PCT Pub. No.: WO2015/188935
PCT Pub. Date: Dec. 17, 2015

(65) Prior Publication Data
US 2017/0195208 A1 Jul. 6, 2017

(30) Foreign Application Priority Data

Jun. 10, 2014 (DE) .................... 20 2014 004 625 U
Sep. 10, 2014 (DE) .................... 20 2014 007 214 U

(51) Int. Cl.
*H04L 12/751* (2013.01)
*H04L 1/00* (2006.01)
(Continued)

(52) U.S. Cl.
CPC ............ *H04L 45/02* (2013.01); *H04L 1/0041* (2013.01); *H04L 5/0001* (2013.01); *H04L 41/0806* (2013.01); *H04L 41/145* (2013.01); *H04L 43/0876* (2013.01); *H04L 1/1819* (2013.01); *H04L 2001/0096* (2013.01)

(58) Field of Classification Search
CPC ... H04L 45/02; H04L 41/0806; H04L 5/0001; H04L 41/145; H04L 43/0876; H04L 2001/0096; H04L 5/0035; H04L 5/0055; H04L 5/0057; H04L 12/2869; H04L 12/5695; H04L 47/00; H04L 47/70;
(Continued)

(56) References Cited

U.S. PATENT DOCUMENTS

| | | | |
|---|---|---|---|
| 2003/0005387 A1* | 1/2003 | Tsunoda | H03M 13/00 714/785 |
| 2008/0288986 A1* | 11/2008 | Foster | G08B 13/19656 725/62 |
| 2016/0173237 A1* | 6/2016 | Braun | H04L 1/0056 370/242 |

* cited by examiner

Primary Examiner — Jung Liu
(74) Attorney, Agent, or Firm — Fay Sharpe LLP

(57) ABSTRACT

The invention relates to a device, in particular a router, for bundling a plurality of Internet access lines into a virtual Internet access line for the purpose of providing the sum of the bandwidths of the plurality of Internet access lines for a transmission of data via the virtual Internet access line, wherein the device divides a data packet to be transmitted among a plurality of data packets for separate transmission via the plurality of Internet access lines, wherein the device is designed to calculate redundancy information and to transmit said redundancy information along, from which redundancy information lost data packets can be restored, such that packet losses on an Internet access line do not lead to packet losses on the bundled virtual line.

17 Claims, 2 Drawing Sheets

(51) Int. Cl.
*H04L 5/00* (2006.01)
*H04L 12/24* (2006.01)
*H04L 12/26* (2006.01)
*H04L 1/18* (2006.01)

(58) Field of Classification Search
CPC ..... H04L 47/78; H04L 47/821; H04L 47/827; H04L 72/04
See application file for complete search history.

DEVICE FOR BUNDLING A PLURALITY OF INTERNET ACCESS MEDIA WITH FORWARD ERROR CORRECTION

The present invention claims priority on PCT Application No. PCT/EP2015/001167 filed Jun. 10, 2015, which in turn claims priority on German Patent Application No. 20 2014 004 625.5 filed Jun. 6, 2014 and German Patent Application No. 20 2014 007 214.0 filed Sep. 10, 2014.

The invention relates to routers for bundling several internet access lines into a virtual internet access line and to a system for internet data transmission via individual transmission lines, as well as to an assembly for internet data transmission over several individual data transmission lines, an auxiliary transmitting device and an auxiliary receiving device. In particular, the invention relates to a device such as an internet access router, which can use several different internet accesses simultaneously, and thereby places the total capacity of connected lines at the disposal of the user, with the characteristic feature that all IP packets are transmitted without losses and delays from a user perspective as the result of forward error correction, even given disruptions with significant packet losses on a portion of the lines.

Bundling several different wired or wireless internet lines for purposes of parallel data transmission, and hence increasing the bandwidth, is known from U.S. Pat. No. 8,125,989 B2 or EP 1 976 202 A2. The methods and devices described therein are included in this application by reference.

One typical intended use for this technique is as an internet router installed in a vehicle (automobile, train, airplane), which combines several different mobile internet accesses, for example all mobile providers in a country. A single mobile network will always have dropouts while traveling, e.g., when the signal path to the respective cell tower of the mobile provider is blocked or the transmission mast is destroyed. For this reason, a single mobile line is unusable for mission-critical applications that require the prompt and lossless delivery of data packets (e.g., in healthcare).

Existing bundling solutions of the kind known from the publications mentioned at the outset can provide the bandwidths of all connected internet accesses bundled together. However, if packets are lost during data transmission on one of the lines, they must be retransmitted again over one of the other lines. As a result, signal propagation delays yield delays in useful data transmission.

Therefore, the object of the invention is to create devices for data transmission over bundled network access lines that are more stable, in particular with respect to packet losses on one or more of the network access lines.

SUMMARY OF THE INVENTION

This object is achieved by routers for bundling several internet access lines into a virtual internet access line and to a system for internet data transmission via individual transmission lines, as well as to an assembly for internet data transmission over several individual data transmission lines, an auxiliary transmitting device and an auxiliary receiving device.

The use of forward error correction makes it possible to completely offset dropouts on one or several of the lines, without requiring retransmissions. For example, when combining 4 internet access lines (wireless or wired), packet losses of up to 25% can be offset without a retransmission being required.

In summary, the present invention is directed to a device such as a router for bundling several internet access lines into a virtual internet access line to prepare the sum of bandwidths of the several internet access lines for a data transmission over the virtual internet access line. The device is configured to divide a data packet to be transmitted into several data packets for separate transmission over the several internet access lines. The device is also designed to calculate and transmit redundancy information, from which lost data packets can be restored, so that packet losses on an internet access line do not lead to packet losses on the bundled virtual line.

In one non-limiting aspect of the invention, the packet losses on the physical lines are offset by first transmitting redundancy information on the lines not affected by packet losses, so that the original data can be completely restored on the receiving side.

In another non-limiting aspect of the invention, the transmitted data involve those in the internet protocol format (IP).

In another non-limiting aspect of the invention, the redundancy information is generated by distributed parity information based on an XOR linkage of the useful data.

In another non-limiting aspect of the invention, the redundancy information is generated by distributed, doubled parity information based on Galois field multiplications.

In another non-limiting aspect of the invention, the redundancy information is generated and transmitted in packets.

In another non-limiting aspect of the invention, the redundancy information is generated and transmitted in subpackets, i.e., a data packet is divided into several fragments, and additional fragments carry the redundancy information.

In another non-limiting aspect of the invention, the respective current quality characteristics of the individual lines (latency, costs, packet loss rate, bandwidth) are drawn upon for the selection of lines and the quantity of redundancy information to be transmitted.

In another non-limiting aspect of the invention, given a later negative change in the quality characteristics of the line for data that has already been sent but not yet arrived, the latter are speculatively retransmitted over a line that continues to satisfy the quality requirements.

In another non-limiting aspect of the invention, the device automatically predicts the future packet loss behavior of lines based on the historic behavior of the lines, and based thereupon independently decides how much redundancy information has to be transmitted not to suffer any packet losses for the transmitted useful data.

In another non-limiting aspect of the invention, in the event of a delayed arrival by the packets at a receiving device, a selection can be made through user control as determined by the user as to whether to optionally skip or retransmit missing packets.

In another non-limiting aspect of the invention, the data packets are transmitted compressed and/or encrypted between the auxiliary transmitting device and auxiliary receiving device, and the auxiliary transmitting device marks packets that are absolutely necessary for a continued restoration of the data flow in the auxiliary receiving device, the auxiliary receiving device only confirms these packets marked as essential to the auxiliary transmitting device upon receipt, and, based upon a prediction, the auxiliary transmitting device speculatively retransmits packets not yet confirmed as received.

In another non-limiting aspect of the invention, there is provided a system for internet data transmission via individual transmission lines logically bundled into a virtual data transmission line by means of an auxiliary transmitting device. The data to be transmitted is apportioned to the individual transmission lines. In addition to the data, redundancy information is calculated and transmitted, from which a potentially lost data packet can be reconstructed in an auxiliary receiving device, so that data packet losses on the individual transmission lines are reparable, and do not lead to data packet losses on the virtual data transmission line.

In another non-limiting aspect of the invention, n individual data transmission lines are used, and each virtual data packet is divided into n–1 data packets, a data packet with redundancy information about the n–1 data packets is calculated, and the total of n data packets are sent out over the n individual data transmission lines.

In another non-limiting aspect of the invention, n individual data transmission lines are used, and each virtual data packet is divided into n–2 data packets, and two data packets are calculated with redundancy information about the n–2 data packets, and the total of n data packets are sent out over the n individual data transmission lines.

In another non-limiting aspect of the invention, there is provided an assembly for internet data transmission over several individual data transmission lines. The system includes an auxiliary transmitting device such as a device or router as described above which is connected to the internet via several individual data transmission lines. The system also includes an auxiliary receiving device such as a device or router as described above which is connected to the internet via several individual data transmission lines, and wherein the auxiliary transmitting device and auxiliary receiving device are designed to divide a data packet to be transmitted into several data packets for separate transmission over the several internet access lines and to calculate and transmit redundancy information, from which lost data packets can be restored, so that packet losses on an internet access line do not lead to packet losses on the bundled virtual line.

In another non-limiting aspect of the invention, there is provided an auxiliary transmitting device that can be coupled to n individual data transmission lines, wherein n>1, and wherein the auxiliary transmitting device is designed to divide a data packet to be sent into n–m data packets, as well as to calculate m data packets with redundancy information, wherein m<n.

In another non-limiting aspect of the invention, there is provided an auxiliary receiving device that can be coupled to several individual data transmission lines, and wherein the auxiliary receiving device is designed to receive several data packets, including at least one data packet with redundancy information, and to restore lost data packets from received data packets by means of the redundancy information/data.

Additional embodiments and characteristics of the invention may be gleaned from the following description, the figures and the claims.

DETAILED DESCRIPTION OF EXEMPLARY EMBODIMENTS

Figure 1:
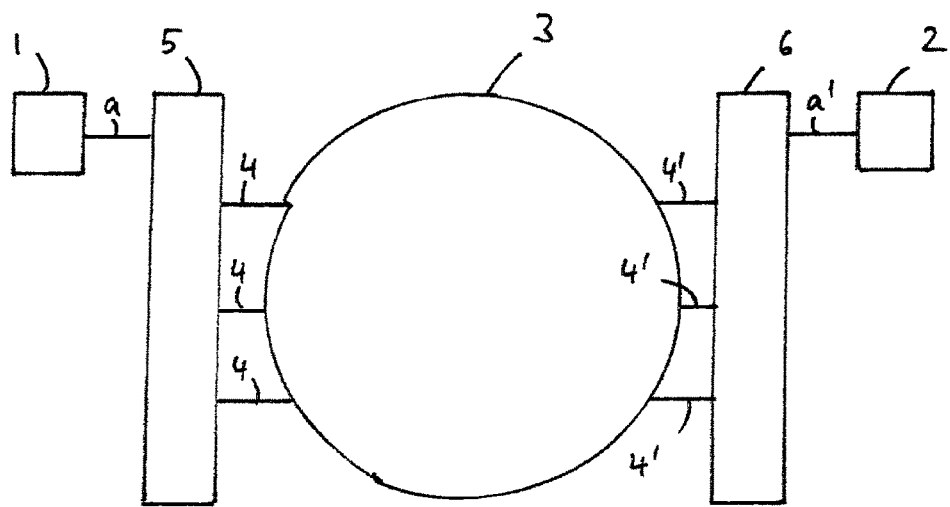
FIG. 1 illustrates the principle underlying the invention of bundling internet access lines.

The assembly depicted in FIG. 1 is for transmitting a data stream a from a transmitting device 1 to a receiving device 2 over a packet-based network, in particular the internet 3, encompasses a respective device 5, 6 on the transmitter and receiver side, preferably in the form of a respective router, wherein several network access lines 4, 4' can be provided on the transmitter and/or receiver side to increase the data transmission rate and/or to increase the reliability. The device 6 can potentially also be located in the internet, and transmit the composite data stream a' over a line to the receiving device 2, which then can exhibit a conventional design. These types of assemblies along with the accompanying transmission methods are known from U.S. Pat. No. 8,125,989 B2 or EP 1 976 202 A2 of the applicant, and will not be described further here, but rather be made part of the present disclosure by way of reference.

Figure 2:
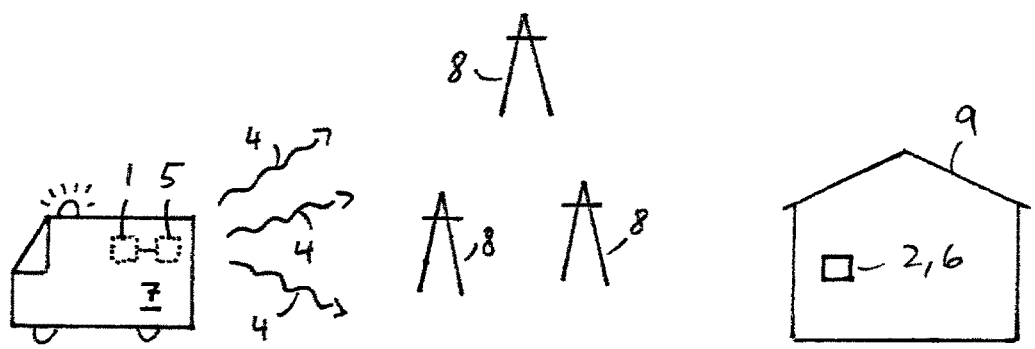
FIG. 2 illustrates an embodiment.

The transmitting device can be a computer or medical device, see FIG. 2, which in an ambulance 7 is linked to the internet by the device 5 according to the invention, e.g., a wireless router connected with several wireless networks 4, as well as cell towers 8, and ultimately connected with a remote station, e.g., a telemedicine setup at a clinic 9, preferably also by way of the device 6 according to the invention, e.g., a router with wireless and/or wired network access lines. It is possible to have the remote station 6 be located in the internet, and provide a simple router 2 with just a single internet access line 4' at the clinic.

In the embodiment shown, the location of the user (e.g., inside the vehicle 7) has a device 5 according to the invention, herein in the form of a router (auxiliary transmitting device+auxiliary receiving device), which is hooked up to several wireless and/or wired internet access lines 4 (e.g., radio modems). IP data packets from and in the internet are not directly sent by the transmitting device 1 via the connected internet access lines 4, but instead in particular encapsulated via the device 5, preferably via a VPN tunnel to the counterpart 6 of the device, e.g., which can be configured as a router in the internet (auxiliary transmitting device+auxiliary receiving device), in which the packets are potentially decapsulated and then relayed to the actual destination 6. Packets from the internet to the user also initially pass through a corresponding router before expediently being encapsulated and sent to the router of the user.

The object of the invention is now to divide IP data packets from/to the user in the auxiliary transmitting devices/auxiliary receiving devices into several fragments as a function of the number of available connected lines, wherein the number of fragments corresponds to the number of lines that currently satisfy the quality requirements minus 1, for example, and furthermore to generate at least one additional fragment containing redundancy data from the remaining fragments, and to then send this fragment over the remaining line.

This forward error correction makes it possible to drastically minimize transmission errors and transmission delays: Precisely in mobile networks, each different network frequently has brief dropouts, in particular when used in a moving vehicle, because the connection to a cell tower or transmission from one cell tower to the next leads to transmission dropouts. However, these dropouts as a rule do not happen at the same time when using several mobile providers, but are rather delayed, since each provider has its own cell tower. By transmitting redundancy data, the auxiliary receiving device can both offset such packet losses and also prevent packet transmission delays, since in most cases one no longer has to wait for delayed fragments, but can instead regenerate the missing fragment from the forward error correction data.

System

Figure 3:
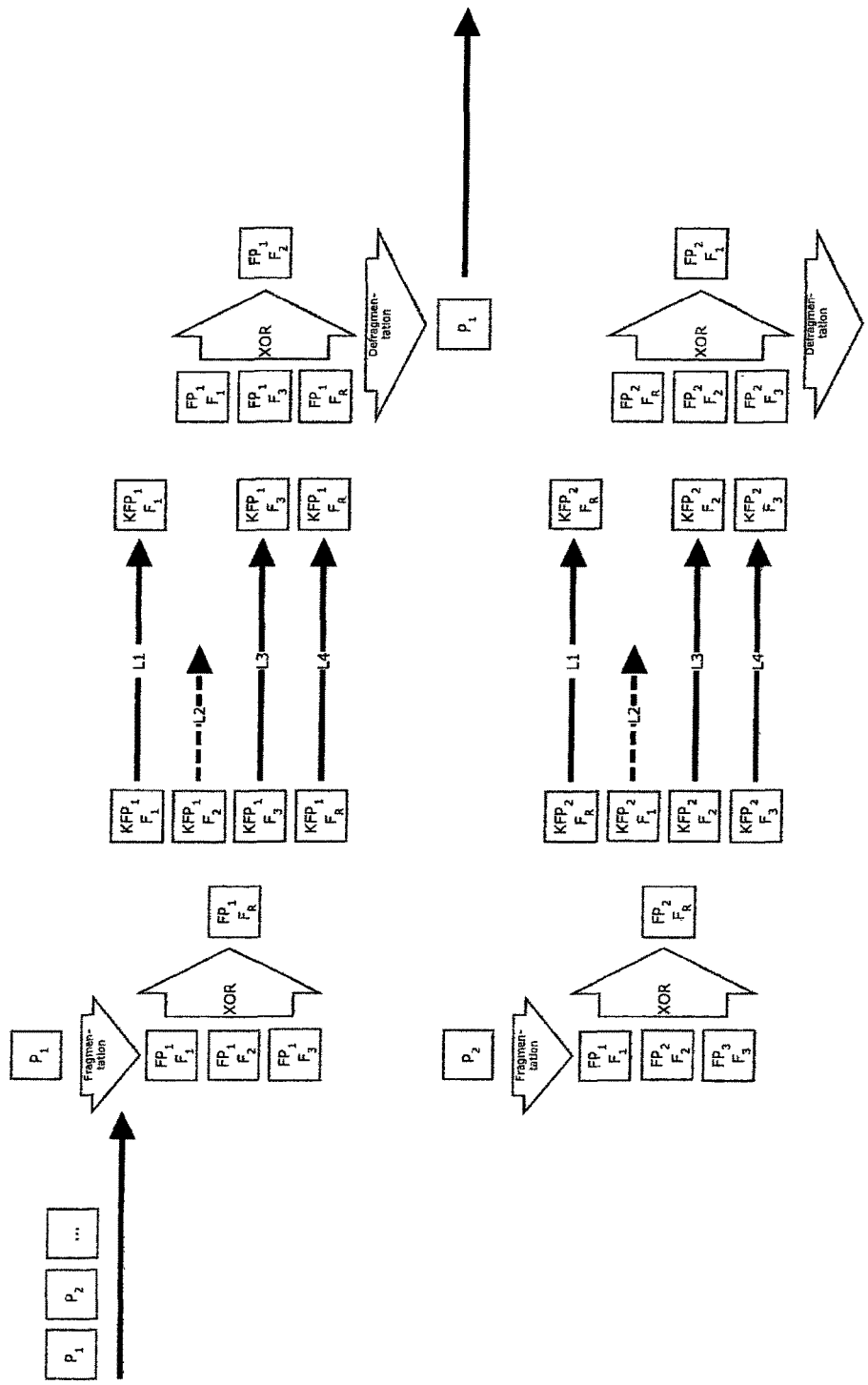
FIG. 3 illustrates the system according to the invention for data redundancy.

The system according to the invention for implementing a method will be described with reference to FIG. 3.

An IP data packet P1 is sent out by the sender with the destination address of the recipient. It is relayed to the router, which serves as an auxiliary transmitting device.

The auxiliary transmitting device checks whether the IP data packet belongs to an existing connection flow. If this is not the case, a new, unique connection flow number $F_1$ is generated and assigned to the IP data packet. If this is the case, the existing connection flow number is assigned to the IP data packet.

Based on the quality rules stored in the auxiliary transmitting device, the auxiliary transmitting device now determines which of the connected internet access media is possible for transporting this packet. Possible criteria include: Line latency (time required by a packet to reach the auxiliary receiving device from the auxiliary transmitting device on this line), packet loss rate of this line between the auxiliary transmitting device and auxiliary receiving device, costs for data transmission on this line, along with other criteria.

After the auxiliary transmitting device has determined which lines can be used for the IP data packet $P_1$, the determined lines are stored in the list $P_1L$. The number of entries on this list is stored in $NP_1L$.

If the value $NP1L=0$, no lines are currently available. In this case, the IP data packet is either discarded, or buffered for a later point in time.

If the value $NP_1L=1$, the data packet is completely stored in the encapsulated packet $KP_1$. The encapsulated packet is marked in the header data of the encapsulation to indicate its completeness. The connection flow number is stored as well. The encapsulated packet is subsequently provided with the source IP address of the only line stored in $P_1L$, and sent to the destination IP address of the auxiliary receiving device over this line.

By contrast, it will be assumed below that $NP_1L=6$, for example, i.e., that more than one line is available for transmission and meets the quality requirements.

Fragmentation of Data Packets

If the value $NP_1L>2$, the data packet $P_1$ is to be fragmented into $NP_1L-1$ equally sized parts. In order to do so, the expected size of the fragments is first determined. Given a size for $P_1$ of 1452 bytes, a division by $NP_1L-1=5$ would yield=290.4 bytes. This size value is rounded up to the next value divisible by 4, i.e., 292 bytes in this case.

Subsequently, 5 fragment packets of 292 bytes each are here now generated. Fragment packet 1 ($FP_1F_1$) receives bytes 2-292 of data packet $P_1$, fragment packet 2 ($FP_1F_2$) receives bytes 293-584, and so on. As a consequence, only 284 bytes from packet $P_1$ are now still available for the last fragment packet $FP_1F_5$. The missing 8 bytes in $FP_1F_5$ are filled with 0 bytes.

Exception: First Packet of a New Connection Flow

If the first packet ($P_1$) of a new connection flow number is involved, care is taken during division to ensure that the size of the fragment is at least large enough for the first fragment to contain the complete header data (IP header data and possibly UDP or TCP header data) of the IP data packet $P_1$. In practice, the fragments of the first IP data packet of a connection flow number must hence have a size of at least 40 bytes. If the packet size of $P_1$ divided by $NP_1L-1<40$, division here takes place into packet size/40 fragments. If there is a remainder after division, division takes place into (packet size/40)+1 fragments. The last fragment then again receives 0 bytes as filler data at the end. Proceeding in this way ensures that, at the point in time the fragment $P_1F_1$ is received, the auxiliary receiving device is able to assign the destination address information of the original IP packet to the transmitted connection flow number $F_1$.

Calculation of Redundancy Information

As a consequence, the auxiliary transmitting device now has the fragment packets $FP_1F_1$ to $FP_1F_5$. In addition, a fragment redundancy packet $FP_1F_R$ with the same length as the fragment packets $FP_1F_1$ to $FP_1F_5$ is now generated. This fragment redundancy packet is filled with redundancy data, which are calculated out of $FP_1F_1$ to $FP_1F_5$. In a preferred method, the first byte from $FP_1F_1$ is to this end linked with the first byte from $FP_1F_2$ via exclusive OR (XOR). The result is then again linked via exclusive OR (XOR) with the first byte from $FP_1F_3$, this result with $FP_1F_4$, and this result with $FP_1F_4$. The result is now stored as the first byte from the fragment redundancy packet $FP_1F_R$. The same process is repeated with the remaining 291 bytes.

As a result, the fragment redundancy packet $FP_1F_R$ contains the result of all XOR linkages of all bytes of the fragment packets $FP_1F_1$ to $FP_1F_5$.

Optional Calculation of Doubled Redundancy Information

Should a high packet loss rate on more than one of the used lines make generating a single redundancy insufficient for ensuring that the auxiliary receiving device can restore the original data even given packet losses, the auxiliary transmitting device can decide to calculate doubled redundancy information. This is possible and expedient when at least 4 lines are available, i.e., $NP_1L>3$. In this case, only $NP_1L-2$ fragments of the data packet $P_1$ are now generated. The first fragment redundancy packet $FP_1F_R$ is subsequently generated as above via XOR linkage. A second fragment redundancy packet $FP_1F_{R2}$ is generated based on Galois field multiplications. This method is known from the redundant storage on data carriers (e.g., Patent DE 19922253 A1), but here described for the first time for use in the real-time data transmission of IP data. If necessary, three or more fragment redundancy packets are generated.

The additional explanations refer to the transmission of single redundancy information, and are to be applied analogously when using multiple, in particular doubled, redundancy information.

Encapsulation and Dispatch of Fragment Packets

Each fragment packet $FP_1$ is now encapsulated in a new IP data packet $KFP_1$. The IP source address of the corresponding line of the auxiliary transmitting device along with the destination IP address of the auxiliary receiving device are stored in the header of the encapsulated packet. The connection flow number $F_1$, the overall number of fragments $NP_1L-1$, as well as the fragment packet number $FP_1Fn$ are also stored. Each packet $KFP_1Fn$ is subsequently sent out via the accompanying line Ln.

The fragment redundancy packet $FU_R$ is encapsulated in $KFP_1F_R$. The IP source address of the line $NP_1L_6$ of the auxiliary transmitting device along with the destination IP address of the auxiliary receiving device are stored in the header of the encapsulated packet. The connection flow number $F_1$, the overall number of fragments $NP_1L-1$, as well as a marking that denotes the involvement of a fragment redundancy packet are also stored. This is done by using a reserved number in the field of the fragment packet number. The encapsulated fragment redundancy packet $KFP_1F_R$ is subsequently sent out via line $NP_1L_6$.

The appropriate process is followed when using doubled redundancy information: The fragment packets $FP_1$ to $FP_4$ are here sent out over lines $L_1$ to $L_4$, the first fragment redundancy packet $FP_1F_R$ over line $L_5$, and the second fragment redundancy packet $FP_1F_{R2}$ over line $L_6$.

Incorrect Sorting and Optional Speculative Retransmission of Fragment Packets

Due to the varying runtimes for the encapsulated fragment packets on the lines or the infrastructure of the network operator connected downstream therefrom, the fragment packets will not reach the auxiliary receiving device in the sequence in which they were sent. Not only can the individual fragments arrive in the wrong sequence (e.g., $KFP_1F_3$, $KFP_1F_2$, $KFP_1F_4$, $KFP_1F_R$, $KFP_1F_4$, $KFP_1F_1$), the actual packet numbers can also arrive in the wrong sequence as the result of overhauls (e.g., $KFP_2F_1$, $KFP_1F_2$, $KFP_2F_5$, $KFP_1F_4$ . . . ).

As explained further on, the described method makes a significant loss of packets very unlikely, and packets can as a rule be restored through fragmentation and forward error correction at the auxiliary receiving device. However, in order to also deal with cases where packet losses arise simultaneously on several lines so as to make restoration impossible in the auxiliary receiving device, line behavior is also checked via heuristics. If the line deteriorates right (within the roundtrip time of the connection between the auxiliary transmitting device and auxiliary receiving device) after sending out the fragments on more than one of the used lines to such an extent as to no longer satisfy the quality requirements for connection flow (e.g., increased latency, complete disconnection), the affected fragments are retransmitted over a line that satisfies the quality requirements in a speculative retransmission.

The Auxiliary Receiving Device

Two lists are kept in the auxiliary receiving device: The list of known connection flows BVF and the list of unknown connection flows UVF.

Once a newly encapsulated fragment packet KFP arrives at the auxiliary receiving device, it is decapsulated, and the header information of the packet is initially checked to see whether the connection flow number is on the list of known connection flows BVF. If this is not the case, a check is performed to determine whether the first fragment of the first packet of this connection is here involved, i.e., $FP_1F_1$. If this is the case, a new entry is generated in the BVF, and a newly generated resorting heap NSH is attached to this entry. The packet $FP_1F_1$ is transferred to this resorting heap. Furthermore, a check is now performed to determine whether additional packets of this connection flow are on the list of unknown connection flows UVF, i.e., packets that are later in the sequence, but already arrived before $FP_1F_1$. If this is the case, the packets contained therein are transmitted to the resorting heap in the BVF, and the entry in the UVF is deleted.

If the received packet is one whose connection flow number does not appear on the list of known connection flows BVF, and the first fragment of the first packet ($FP_1F_1$) of this connection flow is not involved, a check is performed to determine whether the connection flow number appears on the list of unknown connection flows UVF. If this is the case, the packet is added there. If this is not the case, an entry is generated on the list of unknown connection flows UVF, and the packet is added.

If the received packet is one whose connection flow number does appear on the list of known connection flows BVF, the packet is added to the resorting heap HSP of the list entry in the BVF.

Resorting Heap Input

If data are transferred to the resorting heap, a check is first performed to determine whether a complete packet or a fragment is involved. If a complete packet is involved, a check is performed to determine whether the sequence number of the packet lies within the expected range (i.e., a delayed duplicate is not involved), after which it is sorted into the resorting heap. Furthermore, the sequence number of the packet is marked as present in a hash table.

If a complete packet is not involved, but rather a fragment, a check is initially performed to determine whether a fragment card already exists for the sequence number of the fragmented packet. If this is not the case, a new fragment card is created. Based on the header data of the fragment packets, the fields indicating the number of fragments of this sequence number are recorded on the card, and the useful data of this packet are copied. If a fragment redundancy packet is involved, the data are instead stored in a separate data field for parity information within the fragment card.

If the number of fragments recorded on the card now corresponds to the overall number of fragments of this sequence number, the now complete packet is sorted into the resorting heap, and the sequence number is marked as present on the hash table.

If the number of fragments recorded on the card corresponds to the overall number of fragments minus 1, i.e., if only a single fragment is missing, and if parity data (i.e., a fragment redundancy packet) were already received, the parity data are used to restore the missing fragment. To this end, all present fragments are sequentially XOR linked with the content of the parity data field of the fragment card. The result in the parity data field is then copied to the location of the missing fragment. The now complete packet is sorted into the resorting heap, and the sequence number is marked as present on the hash table.

In the event of doubled redundancy information, the original packet can already be generated again once n−2 fragments have arrived at the auxiliary receiving device.

Resorting Heap Output

The resorting heap stores the next packet sequence number to be output. When generated, the heap has the value 1. After each input into the resorting heap, the auxiliary receiving device checks whether an output is now possible. Even though the characteristics of the binary heap ensure that the data contained in the resorting heap are sorted correctly (in ascending order), gaps may be present due to packets that have not yet arrived. Therefore, the output function of the resorting heap checks whether the sequence number of the first present packet corresponds to the expected next sequence number. If this is the case, the packet is output, and the expected next sequence number is increased by one; if this is not the case, no packet is output.

Optional Delivery Signaling and Retransmission

As a rule, the described invention will make it possible to provide the useful data to the auxiliary receiving device in a timely manner through forward error correction, even given highly disrupted lines. In the event of a simultaneous, sudden disruption of several lines that could not be anticipated by the auxiliary transmitting device based on the behavior history, it can still happen that one or more packet fragments would not arrive at the auxiliary receiving device, or only after a long delay. In this case, the described behavior would require that the auxiliary receiving device wait until such time as the missing fragment arrives. In order to avoid this, the auxiliary receiving device continuously determines the average time that elapses between the reception of the first and last fragment of a packet. As a rule, this time should correspond to the difference between the lowest and highest latency between the auxiliary transmitting device and auxiliary receiving device for this connection flow. If this statistically expected delay is now significantly exceeded during resorting in the resorting heap, it must be assumed that one of the fragment packets has been lost or significantly delayed.

In order to counter this case, the user can choose between two different approaches within the framework of service quality settings:

a) Skip Missing Packets

If the resorting heap is unable to reestablish a seamless connection flow in time, the missing packets are skipped. As a consequence, the problem of the missing useful data packets is left to higher transmission layers, e.g., TCP or UDP. While the connection flow of user data will in this instance have gaps on rare occasions, it will arrive at the final recipient with a uniform delay. For example, this is desired for services like telephony or video conferences.

b) Retransmit Missing Packets

If the corresponding user option is selected, the auxiliary receiving device cyclically notifies the auxiliary transmitting device for each connection flow which fragment packets have arrived at the auxiliary receiving device. Similarly to the described analysis based on the packet runtimes (latencies) of the individual lines, it is now the auxiliary transmitting device which, based upon missing confirmations, recognizes in a timely manner when all fragment packets have not arrived at the auxiliary receiving device within the expected time window. In this case, the auxiliary transmitting device again speculatively sends out packet fragments over a line other than the one used previously for this fragment.

The transmitted fragment packets can be compressed and/or encrypted between the auxiliary transmitting device and auxiliary receiving device. Depending on the used compression and encryption procedures, it may be that several data packets are essential to the auxiliary receiving device, meaning that the data flow could not be further restored if such a packet were to be missing. In this case, the auxiliary transmitting device could separately mark such essential packets in the header field, even given a user decision for variant a). In this case, the auxiliary receiving device will also signal to the auxiliary transmitting device only the receipt of such essential packets or fragments thereof, and the auxiliary transmitting device according to b) will only transmit such packets. By contrast, the procedure according to a) is followed for all nonessential packets, i.e., the auxiliary receiving device will accept gaps in the data flow to avoid delays in the connection flow.

Relaying of Packets to the Actual Destination

A connection flow exactly corresponding to the input data flow at the auxiliary transmitting device is now generated at the auxiliary receiving device. As soon as the first fragment packet $FP_1F_1$ has reached the auxiliary receiving device, the original header information of the IP packet is again available, so that IP-based routing can now be performed for the data flow. According to configured routing protocols, the connection flow can now be treated as a conventional IP data flow, and relayed to the actual destination.

Bidirectional Data Flows

Implemented in parallel in the auxiliary transmitting device is an auxiliary receiving device, and in the auxiliary receiving device is an auxiliary transmitting device. For a bidirectional useful data flow, the auxiliary receiving device thus now oppositely becomes the auxiliary transmitting device, while the auxiliary transmitting device becomes the auxiliary receiving device. The forward and reverse directions of a connection flow can here be handled independently of each other. However, it is also possible for the auxiliary transmitting device and auxiliary receiving device to automatically assign the forward and reverse flows of the connection flow, and subsequently use bundling parameters separately for both directions.

The invention claimed is:

1. A device for bundling several internet access lines into a virtual internet access line to prepare the sum of bandwidths of the several internet access lines for data transmission over the virtual internet access line, the device is configured to divide a data packet to be transmitted over the virtual internet access line into several data fragments for separate transmission over the several internet access lines, the device is configured to calculate and transmit redundancy information, from which lost data fragments can be restored, so that fragment losses on one or more of the internet access lines do not lead to data fragments losses on the virtual internet access line, the data packet is divided into the several data fragments as a function of a number of available internet access lines minus at least one line that can be used to transmit the data packet.

2. The device according to claim 1, characterized in that the device generates at least one additional redundancy data fragment that includes redundancy data and sends such at least one additional redundancy data fragment over an available internet access line that is not being used to transmit the data fragments so as to offset data fragment losses so that the data packet can be completely restored on the receiving side.

3. The device according to claim 1, characterized in that the transmitted data involve those in the internet protocol format.

4. The device according to claim 2, characterized in that the at least one additional redundancy data fragment is generated by distributed parity information based on an XOR linkage of the useful data.

5. The device according to claim 2, characterized in that the at least one additional redundancy data fragment is generated by distributed, doubled parity information based on Galois field multiplications.

6. The device according to claim 2, characterized in that the data packet is divided into the several data fragments as a function of a number of available internet access lines minus one line that can be used to transmit the data packet, the at least one additional redundancy data fragment is transmitted over the one line that is not used to transmit the data fragments.

7. The device according to claim 2, characterized in that the data packet is divided into the several data fragments as a function of a number of available internet access lines minus two lines that can be used to transmit the data packet, the device is configured to form first and second redundancy data fragments wherein the first redundancy data fragment is transmitted over one of the lines that is not used to transmit the data fragments and the second redundancy data fragment is transmitted over the other line that is not used to transmit the data fragments.

8. The device according to claim 2, characterized in that the respective current quality characteristics of the individual lines are drawn upon for the selection of lines and the quantity of the at least one additional redundancy data fragment to be transmitted.

9. The device according to claim 8, characterized in that, given a later negative change in the quality characteristics of the line for data that has already been sent but not yet arrived, the latter are speculatively retransmitted over a line that continues to satisfy the quality requirements.

10. The device according to claim 1, characterized in that the device automatically predicts the future data fragment loss behavior of lines based on the historic behavior of the lines, and based thereupon independently decides how much redundancy data has to be transmitted so as to not suffer any data fragment losses for the transmitted useful data.

11. The device according to claim 1, characterized in that, in the event of a delayed arrival by the data fragments at a receiving device, a selection can be made through user control as determined by the user as to whether to optionally skip or retransmit missing data fragments.

12. A device for bundling several internet access lines into a virtual internet access line to prepare the sum of bandwidths of the several internet access lines for a data transmission over the virtual internet access line, the device is configured to divide a data packet to be transmitted over the virtual internet access line into several data fragments for separate transmission over the several internet access lines, the device is configured to calculate and transmit redundancy information, from which lost data fragments can be restored, so that fragment losses on one or more of the internet access lines do not lead to data fragments losses on the virtual internet access line, and wherein data fragments are transmitted compressed and/or encrypted between the auxiliary transmitting device and auxiliary receiving device, and the auxiliary transmitting device marks packets that are necessary for a continued restoration of the data flow in the auxiliary receiving device, the auxiliary receiving device only confirms these data fragments marked as essential to the auxiliary transmitting device upon receipt, and, based upon a prediction, the auxiliary transmitting device speculatively retransmits data fragments not yet confirmed as received.

13. A system for internet data transmission via individual transmission lines logically bundled into a virtual data transmission line by means of an auxiliary transmitting device, in which data to be transmitted are apportioned to the individual transmission lines, characterized in that, in addition to the data, redundancy information is calculated and transmitted, from which a potentially lost data fragment can be reconstructed in an auxiliary receiving device, so that data fragment losses on the individual transmission lines are reparable, and do not lead to data fragment losses on the virtual data transmission line, and wherein the data is divided into several data fragments as a function of a number of available transmission lines minus at least one line that can be used to transmit the data, and wherein the redundancy information is transmitted on the transmission lines not used for transmission of the data fragments.

14. The system according to claim 13, characterized in that the data is divided into n−1 data fragments wherein n is the number of available transmission lines, a redundancy data fragment with redundancy information about the n−1 data fragments is calculated, and the total of n data packets are sent out over the available data transmission lines.

15. The system according to claim 13, characterized in that the data is divided into n−2 data fragments wherein n is the number of available transmission lines, and two redundancy data fragments are calculated with redundancy information about the n−2 data fragments, and the total of n data packets are sent out over the available data transmission lines.

16. An assembly for internet data transmission over several individual data transmission lines, encompassing an auxiliary transmitting device which is connected to the internet via several individual data transmission lines, as well as an auxiliary receiving device which is connected to the internet via several individual data transmission lines, wherein the auxiliary transmitting device is configured to divide a data packet to be transmitted over the transmission lines into several data fragments for separate transmission over the several transmission lines and to calculate and transmit redundancy information, from which lost data fragments can be restored, so that fragment losses on one or more of the transmission lines do not lead to data fragments losses on the transmission lines, the data packet is divided into the several data fragments as a function of a number of available transmission lines minus at least one line that can be used to transmit the data packet.

17. An auxiliary transmitting device, wherein the auxiliary transmitting device can be coupled to n individual data transmission lines wherein n is the number of available transmission lines and wherein n>1, characterized in that the auxiliary transmitting device is configured to divide a data packet to be sent into n−m data fragments, and wherein the auxiliary transmitting device is configured to calculate m redundancy data fragments with redundancy information, wherein m<n and m is not less than 1, and wherein the auxiliary transmitting device is configured to transmit the data fragments on n transmission lines and to transmit the redundancy data fragments on transmission lines that are not used to transmit the data fragments.

* * * * *